United States Patent
Chatterjee et al.

(10) Patent No.: US 8,503,623 B2
(45) Date of Patent: *Aug. 6, 2013

(54) SYSTEM AND METHOD FOR A VISUAL VOICEMAIL INTERFACE

(75) Inventors: Koushik Chatterjee, Orlando, FL (US); Amanda Livesay, Ridgeway, MO (US); Johnny Hawkins, Kansas City, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,074

(22) Filed: Sep. 13, 2012

(65) Prior Publication Data

US 2013/0003946 A1    Jan. 3, 2013

Related U.S. Application Data

(63) Continuation of application No. 12/340,296, filed on Dec. 19, 2008, now Pat. No. 8,290,126.

(51) Int. Cl.
*H04M 1/64* (2006.01)

(52) U.S. Cl.
USPC .................. 379/88.19; 379/88.11

(58) Field of Classification Search
USPC ............ 379/67.1, 68, 88.08, 88.11, 88.12, 379/88.19, 88.2, 88.22, 88.23, 88.25, 88.13, 379/88.14, 88.26
See application file for complete search history.

(56) References Cited

U.S. PATENT DOCUMENTS

| | | | |
|---|---|---|---|
| 6,069,940 A | 5/2000 | Carleton et al. | |
| 6,298,128 B1 | 10/2001 | Ramey et al. | |
| 6,327,343 B1 * | 12/2001 | Epstein et al. | 379/88.01 |
| 6,792,082 B1 | 9/2004 | Levine | |
| 6,829,331 B2 | 12/2004 | Cullis | |
| 6,873,692 B1 | 3/2005 | Silver et al. | |
| 7,251,313 B1 * | 7/2007 | Miller et al. | 379/88.01 |
| 7,664,636 B1 | 2/2010 | Hirschberg et al. | |
| 8,102,977 B2 | 1/2012 | Baker et al. | |
| 8,290,126 B2 | 10/2012 | Chatterjee et al. | |
| 2003/0026403 A1 * | 2/2003 | Clapper | 379/142.06 |
| 2005/0243979 A1 | 11/2005 | Starbuck et al. | |
| 2008/0043943 A1 | 2/2008 | Sipher et al. | |
| 2009/0252305 A1 | 10/2009 | Rohde et al. | |
| 2010/0030794 A1 | 2/2010 | Ljubicich | |
| 2010/0158211 A1 | 6/2010 | Chatterjee et al. | |
| 2010/0177877 A1 | 7/2010 | Hamaker et al. | |
| 2010/0184409 A1 | 7/2010 | Doulton | |

OTHER PUBLICATIONS

U.S. Appl. No. 12/340,296; Non-Final Office Action dated Apr. 9, 2012; 10 pages.
U.S. Appl. No. 12/340,296; Notice of Allowance dated Jul. 30, 2012; 12 pages.
U.S. Appl. No. 12/340,296; Issue Notification dated Sep. 26, 2012; 1 page.

* cited by examiner

*Primary Examiner* — Olisa Anwah
(74) *Attorney, Agent, or Firm* — Swanson & Bratschun, L.L.C.

(57) ABSTRACT

A system and method for receiving information for voicemail. A call is received from a caller. A voicemail message from the caller is recorded. A caller identifier is received from the caller in response to recording the voicemail message. The caller identifier is associated with one or more profiles. The voicemail message is filed utilizing the associated profile in response to receiving the caller identifier.

20 Claims, 4 Drawing Sheets

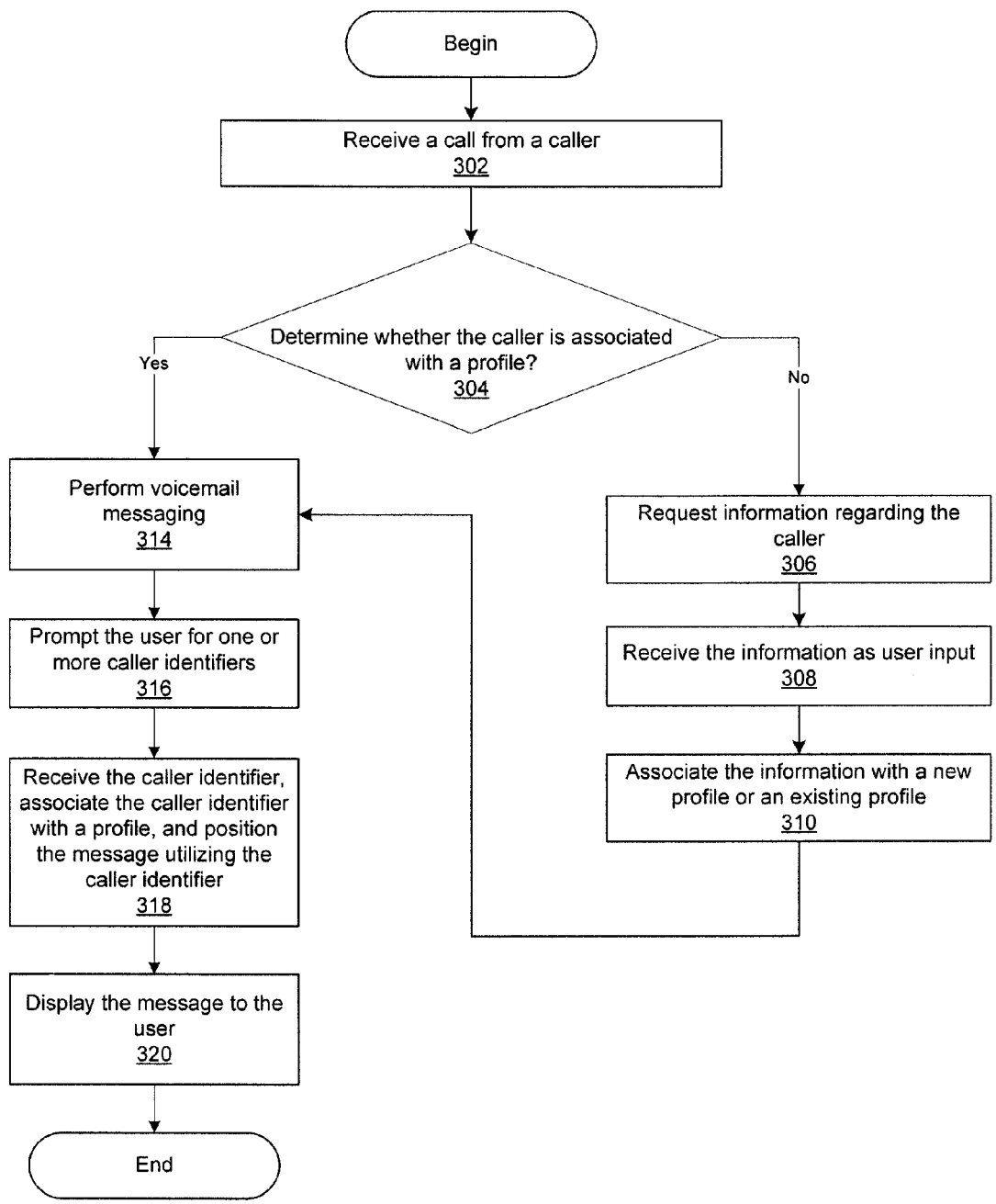

*FIG. 4*

| User Interface | 400 |
|---|---|

✓ Create profile    402
[ Category ▼ ]   ☐ Profile picture

| Caller Input   404 |
|---|

☐ Interactive Voice Response System
☐ Graphical User interface

| Information   406 |
|---|

☐ Name: Doogie Smith
☐ Nickname: Dr. Feelgood
☐ Relationship: Friend
☐ Phone Number: 214-998-9998
☐ IP Address:
☐ Messaging username: Sunshineheartdaisylvr92
☐ Email address: dsmith@XYZ123working.com

| Caller Identifier   408 |
|---|

☐ Name: Doogie Smith
☐ Reason for call: We need to catch up world traveller
☐ Text conversion of message: There is a business meeting on Tuesday at 3:00 that I think you should attend. Call me back so that we can discuss it further.

SYSTEM AND METHOD FOR A VISUAL VOICEMAIL INTERFACE

CROSS REFERENCE TO RELATED APPLICATION

This application is a continuation of U.S. patent application Ser. No. 12/340,296, filed Dec. 19, 2008 by Koushik Chatterjee et al. and entitled, "System and Method for a Visual Voicemail Interface," which is hereby incorporated by reference in its entirety.

BACKGROUND OF THE INVENTION

The use of and development of communications has grown nearly exponentially in recent years. The growth is fueled by larger networks with more reliable protocols and better communications hardware available to service providers and consumers. In particular, voicemail systems available for wired telephones and wireless devices have improved substantially. Voicemail is a system, equipment, application, or device for recording messages for access through one or more networks. Visual voicemail or random access voicemail may add a visual aspect to traditional voicemail allowing a user to manage voicemails visually. Despite the benefits of visual voicemail, voicemail systems are not always able to easily or cheaply retrieve or determine information and data that makes visual voicemail so useful to users.

BRIEF SUMMARY OF THE INVENTION

One embodiment provides a system and computer implemented method for receiving information for voicemail. A call may be received from a caller. A voicemail message may be recorded from the caller. A caller identifier may be received from the caller in response to recording a voicemail message. The caller identifier may be associated with one or more profiles. The voicemail message may be filed utilizing the associated profile in response to receiving the caller identifier.

Another embodiment provides a voicemail system. The voicemail system may include a user interface operable to receive a voicemail message from a caller and a caller identifier. The voicemail system may also include interface logic in communication with the user interface. The interface logic may generate a profile including information about the caller in response to determining the caller is not associated with a pre-existing profile.

Yet another embodiment provides a voicemail system. The voicemail system may include a processor for executing a set of instructions and a memory in communication with the processor. The memory may be operable to store the set of instructions. The set of instructions may be executed to receive a call from a caller, record a visual voicemail message, determine a caller identifier in response to recording the voicemail message, wherein the caller identifier is associated with one or more profiles, generate a new profile in response to determining the caller identifier is not associated with the one or more profiles, wherein the new profile includes information about the caller, and display the visual voicemail message to a user utilizing the associated one or more profiles.

BRIEF DESCRIPTION OF THE DRAWINGS

Illustrative embodiments of the present invention are described in detail below with reference to the attached drawing figures, which are incorporated by reference herein and wherein:

FIG. 3 is a flowchart of a process for receiving caller information in accordance with an illustrative embodiment; and FIG. 4 is a pictorial representation of a user interface in accordance with an illustrative embodiment.

DETAILED DESCRIPTION OF THE INVENTION

Illustrative embodiments provide a system and method for allowing callers to interface with a voicemail system. In particular, an interactive voice response (IVR) system may be utilized to receive one or more data, numbers, identifiers, and other information that is associated with a caller leaving, or otherwise, generating a message. In one embodiment, the information may be associated with the caller as a profile. As a result, the information may be utilized to leave a message in the voicemail system. The illustrative embodiments may further enhance voicemail and visual voicemail systems by providing information that may be utilized by a user to review or manage messages and information, make decisions, or perform any number of actions or responses. The voicemail system may save money by not paying to access databases of other service providers.

In another embodiment, a caller identifier that is automatically or manually retrieved may be utilized to determine the appropriate profile. As a result, a selected profile may be selected even if the caller is calling from an unrecognized device, phone, or line. In one embodiment, the profile may be retrieved utilizing voice recognition information to determine the appropriate profile with which to associate the message.

Figure 1:
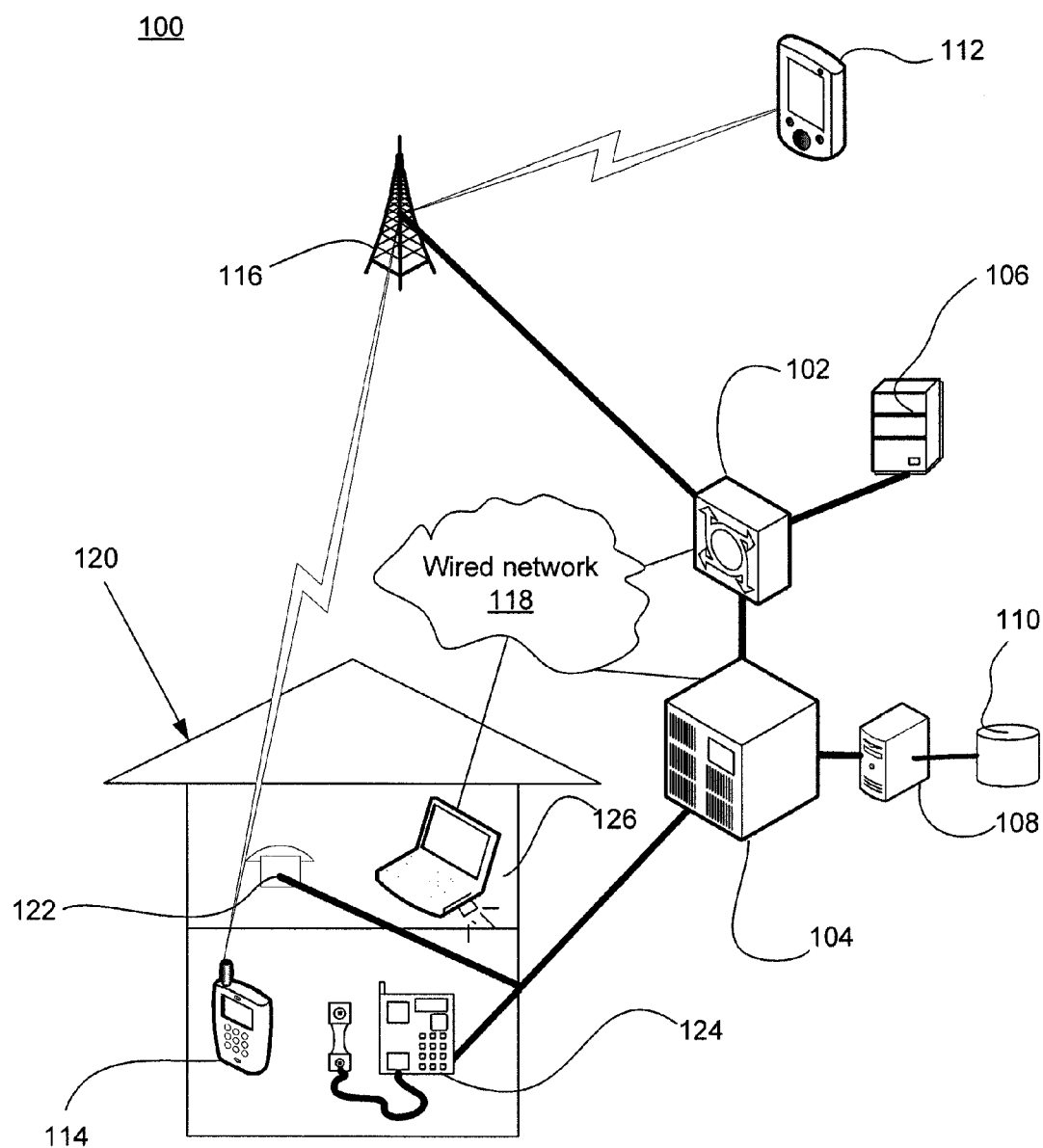
FIG. 1 is a pictorial representation of a communication system in accordance with an illustrative embodiment.

FIG. 1 is a pictorial representation of a communications system in accordance with an illustrative embodiment. The communications system 100 of FIG. 1 includes various elements used for wireless and wired communication. The communications system 100 includes a mobile switching center (MSC) 102, a local exchange 104, voicemail systems 106 and 108, a database 110, wireless devices 112 and 114, a transmission tower 116, a wired network 118, a home 120, home telephones 122 and 124, and a client 126. The different elements and components of the communications system 100 may communicate using wireless communications, such as satellite connections, WiFi, WiMAX, CDMA wireless networks, and/or hardwired connections, such as fiber optics, T1, cable, DSL, high speed trunks, and telephone lines.

The wireless devices 112 and 114 may communicate with the transmission tower 116 using communications protocols, such as time division multiple access (TDMA), code division multiple access (CDMA), global systems for mobile (GSM) communications, personal communications systems (PCS), WLAN, WiMAX, or other frequently used cellular and data communications protocols and standards. The wireless devices 112 and 114 may include cellular phones, Blackberry® devices, personal digital assistances (PDA), mp3 players, laptops, evolution data optimized (EDO) cards, multi-mode devices, and other wireless communication devices and elements.

Communications within the communications system 100 may occur on any number of networks which may include wireless networks, data or packet networks, cable networks, satellite networks, private networks, publicly switched telephone networks (PSTN), the wired network 118, or other types of communication networks. A communications network is infrastructures for sending and receiving messages and signals according to one or more designated formats, standards, and protocols. The networks of the communications system 100 may represent a single communication service provider or multiple communications services providers. The features, services, and processes of the illustrative embodiments may be implemented by one or more elements of the communications system 100 independently or as a networked implementation.

The communications system may include one or more communications management systems. The communications management system is one or more devices utilized to enable, initiate, route, and manage communications between one or more telephonic devices. The communications management system may include one or more devices networked to manage the communications networks of the communications system 100. For example, the communications management system may include any number of servers, routers, switches, or advanced intelligent devices. The communications network sends and receives the electronic signals through any number of transmission mediums. The communications network may include various fiber optics, cables, transmission towers, antennas, or other elements for transmitting voice communications to the connected telephonic and computing devices. In a preferred embodiment, the communications management system and the communications networks of the communications system 100 implement voice and data communications with the home telephones 122 and 124 and wireless devices 112 and 114 through voice over Internet Protocol (VoIP) service, wireless service, plain old telephone service (POTS), wireless service, or other forms of communications.

In one embodiment, the MSC 102, voicemail system 106, and transmission tower 116 are part of a wireless network that is operated by a wireless service provider. For example, the control signals and operational features may be performed by the MSC 102, and the wireless signals may be broadcast from the transmission tower 116 to the wireless devices 112 and 114. The wireless network may include any number of systems, towers, servers, and other network and communications devices for implementing the features and performing the methods herein described. The wireless network may enable cellular, data, radio, television service, or other wireless schemes. For example, the transmission tower 116 may transmit signals to cell phones, Blackberry® devices, car radios, and high definition televisions.

The MSC 102 may be a switch used for wireless call control and processing. The MSC 102 may also serve as a point of access to the local exchange 104. The MSC 102 is a telephone exchange that provides circuit switched calling and mobility management and may also provide GSM or PCS services to the wireless devices 112 and 114 located within the area the MSC 102 serves. The MSC 102 may include or communicate with a home location register (HLR) and visitor location register (VLR). The voicemail system 106 may be an integrated part of the MSC 102, or alternatively, may be an externally connected device.

In one embodiment, the voicemail system 106 may include an integrated database for storing customer and usage information, electronic profiles, and data. In another embodiment, the voicemail system 106, a server, metaswitch, or other intelligent network device may store user preferences, logic, voice-to-text conversion applications, and interactive voice response (IVR) systems to interact with a caller to receive and enter information, as further described herein. The user may communicate, interact, or send and receive data, information, and commands to the voicemail system 106 through the telephones 122 and 124, wireless devices 112 and 114, or the client 126. The MSC 102 and voicemail system 106 may include any number of hardware and software components.

The local exchange 104, the MSC 102, and/or other elements of the communications system 100 may communicate using a signal control protocol, such as a signaling system number 7 (SS7) protocol, TCP/IP protocols, and other telecommunications and computing protocols. The SS7 protocol or similar protocols are used in publicly switched networks for establishing connections between switches, performing out-of-band signaling in support of the call-establishment, billing, routing, and implementing information-exchange functions of a publicly switched network or the wired network 118. The local exchange 104 may be owned and operated by a local exchange carrier that provides standard telephone service to any number of users. In one embodiment, the local exchange 104 may be a class 5 switch that is part of the network systems of the local carrier. The local exchange 104 may include or may be connected to the voicemail system 106. However, the local exchange 104 may also be a Digital Subscriber Line Access Multiplexer (DSLAM), Internet Protocol (IP) gateway, base station, or any other suitable network access point.

The local exchange 104 may be a wire-line switch or public exchange using time domain multiplexing to provide telecommunications services to a particular subscriber or groups of subscribers. The local exchange 104 may be located at a local telephone company's central office, or at a business location serving as a private branch exchange. The local exchange 104 may provide dial-tone, calling features, and additional digital and data services to subscribers, such as home telephones 122 and 124. The local exchange 104 may also enable VoIP communication of the home telephones 122 and 124 through a data network. VoIP may work by sending voice information in digital form, such as packets, rather than using the traditional circuit-committed protocols of the publicly switched network. The local exchange 104 may be or include a feature server, a call control agent, and/or an IP gateway for implementing VoIP communications.

The communications system 100 may further include any number of hardware and software elements that may not be shown in the example of FIG. 1. For example, in order to facilitate VoIP communications, the communications system 100, the MSC 102, and local exchange 104 in particular, may include additional application servers, media servers, service brokers, call agents, edge routers, gateways (signaling, trunking, access, sub, etc.), IP network service providers, adapters, exchanges, switches, users, and networks. The voicemail system 108 is similar to the voicemail system 106 except that it is equipped to handle voicemail for landline or hardwired users rather than wireless users. The voicemail system 108, local exchange 104, or other components of a wire line network, such as a data, PSTN, VoIP, or other wired networks may implement the features and perform the methods herein described.

The MSC 102 and the local exchange 104 may include an authentication space. The authentication space may be a partition, module, or other storage or memory of the server designated by the communications service provider. The authentication space may validate that a user or device, such as client 126, is allowed to authorize the MSC 102, local exchange 104, servers, switches, network devices, or corresponding voicemail systems 106 and 108 to set preferences, implement changes, review information, or perform other updates. For example, a user may be first required to provide a secure identifier, such as a user name, password, or other authentication code or hardware interface, to verify the user is authorized to make changes within the authentication space.

For example, a user may configure the voicemail systems to send a call or message notification to the user when a call or message is received.

The authentication information may be also used to create a secure connection between the client and the MSC 102, a server, or the local exchange 104. The secure connection may be a virtual private network tunnel, an encrypted connection, firewall, or other form of secured communications link. The MSC 102 and local exchange 104 may use any number of gateways, proxies, applications, or interfaces for allowing the client 126 to communicate with the MSC 102 and local exchange 104 through the wired network 118. Alternatively, the client 126 may use a wireless network or other network to access the MSC 102 and local exchange 104. The MSC 102 and local exchange 104 may use a host client application for communicating with numerous clients.

The home 120 is an example of a dwelling, residence, or location of a person or group that may utilize any number of communications services. The home 120 is shown as a residence in the illustrated example, however, the home 120 may also be an office, business, or other structure wired or otherwise suitably equipped to provide telephone, data, and other communication services to one or more customers. In one embodiment, the home 120 is equipped with multiple communication devices, including home telephones 122 and 124, and client 126. The home telephones 122 and 124 may be standard devices that provide dialing and voice conversation capabilities. For example, the home telephone 122 may be integrated in any number of other devices or may be used in different forms. For example, the home telephone 122 may be part of a refrigerator or intercom system. In another embodiment, the home telephone 124 may be integrated with a personal computer, such as client 126.

The communications services accessible from the home telephones 122 and 124 may include POTS, WiFi, WiMAX, or VoIP telephone service. The home telephones 122 and 124 may be VoIP, soft, or standard telephones that include a modem and/or VoIP adapters for enabling VoIP communications.

The client 126 may be a personal computer for performing and executing programs and instructions and accessing the wired network 118. However, the client 126 may be any computing devices suitable for communicating with the wired network 118 through a network connection. The wired network 118 may be a fiber optic, cable, or telephone network, or other wired network suitable for communication over a hard wired connection with the client 126. In one embodiment, the home 120 may include a wireless router, adapter, switch, hub, or other suitable interface that allows the client 126 to communicate with the wired network 118. Alternatively, the client 126 may communicate with the wired network 118 through a wireless connection. The MSC 102 and local exchange 104 may use a graphical user interface (GUI), such as a website or program accessible from the client 126 in order to review and configure information, parameters, and settings for the voicemail systems 106 and 108.

In an illustrative embodiment, a caller or the user may provide voice commands, input, or otherwise make selections and communicate commands using devices, such as or similar to, wireless devices 112 and 114, home telephones 122 and 124, and client 126.

Figure 2:
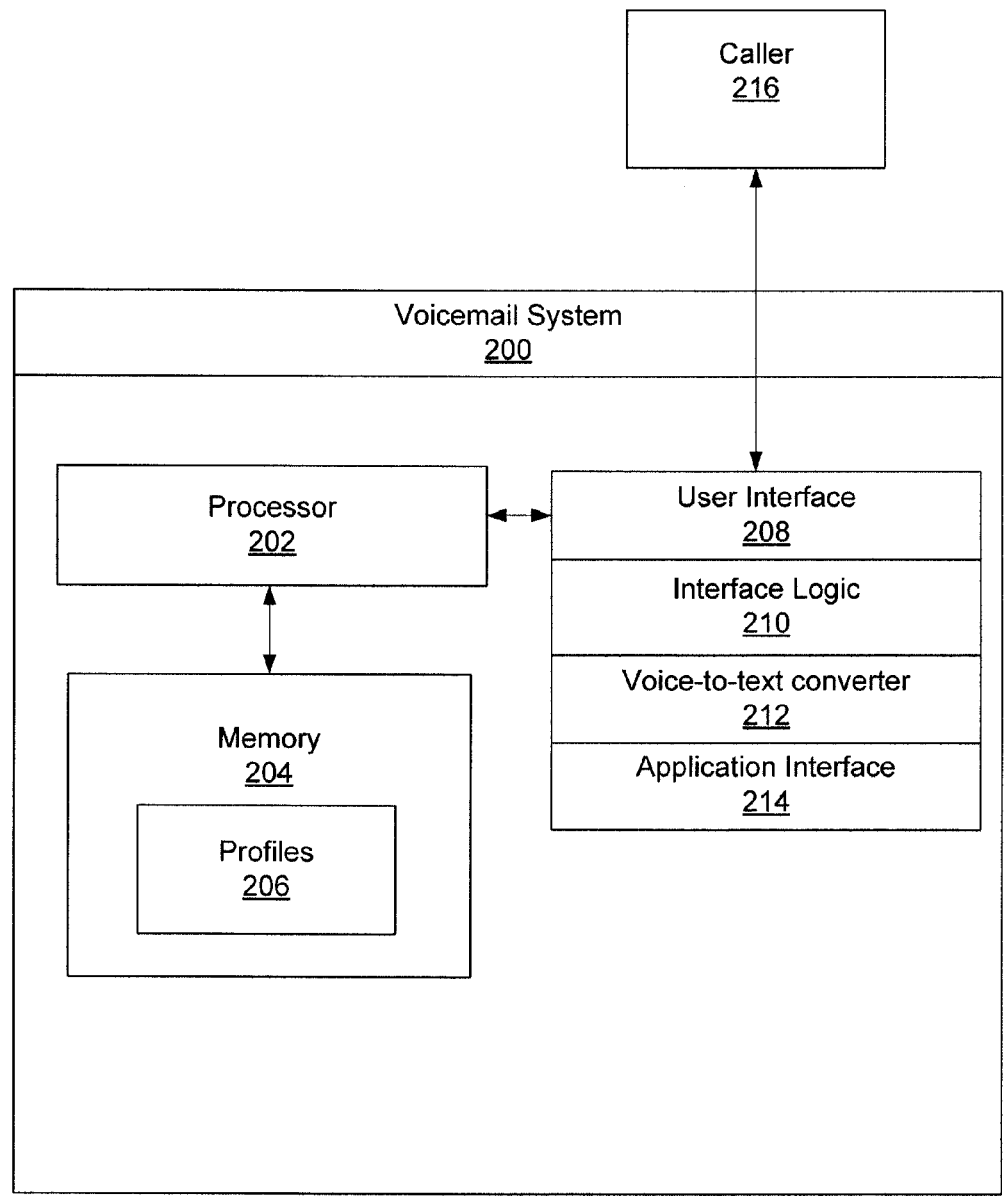
FIG. 2 is a block diagram of a voicemail system in accordance with an illustrative embodiment.

FIG. 2 is a block diagram of a voicemail system in accordance with an illustrative embodiment. The voicemail system 200 is a particular implementation of the voicemail systems 106 and 108 of FIG. 1. In one embodiment, the voicemail system 200 is a server utilized by a communications service provider, business, organization, or individual. However, the voicemail system 200 may also be any number of devices, equipment, or systems that may communicate to perform the services, features, and processes herein described. The voicemail system 200 may include any number of boards, cards, busses, interfaces, displays, databases, memory, electronic storages, adapters, circuits, logic, or other computing or communication elements or devices not specifically described herein for purposes of simplicity. In one embodiment, the voicemail system 200 may include a processor 202, a memory 204, profiles 206, user interface 208, interface logic 210, voice-to-text converter 212, application interface 214, and caller 216.

The processor 202 is circuitry or logic enabled to control execution of a set of instructions. The processor 202 may be a microprocessor, digital signal processor, central processing unit, or other device suitable for controlling an electronic device, including one or more hardware and software elements, executing software, instructions, programs and applications, converting and processing signals and information, and performing other related tasks. The processor 202 may be a single chip or integrated with other computing or communications elements.

The memory 204 is a hardware element, device, or recording media configured to store data for subsequent retrieval or access at a later time. The memory 204 may be static or dynamic memory. The memory 204 may include a hard disk, random access memory, cache, removable media drive, mass storage, or configuration suitable as storage for data, instructions, and information. In one embodiment, the memory 204 and processor 202 may be integrated. The memory may use any type of volatile or non-volatile storage techniques and mediums.

The illustrative embodiments may be implemented in hardware, software, firmware, or a combination thereof. In one embodiment, the memory 204 may store a voicemail interface application that may be executed by the processor 202 to perform the features and steps herein described. In other embodiments, fixed or programmable logic may be utilized by hardware within the voicemail system 200 to implement an illustrative embodiment.

The caller 216 is a particular implementation of the wireless devices 112 or 114 or the home telephones 122 or 124 of FIG. 1. The caller 216 represents a caller or calling party utilizing a telephonic device to call a user or receiving party. The call may be subsequently routed, intercepted, or picked up by the voicemail system 200 in order to allow the caller 216 to enter information and leave a message as herein described.

The memory 204 may include one or more databases. The databases may store the profiles 206. The profiles 206 are records including information and data about a number of callers. Each of the profiles 206 may include user specified information, as well as information retrieved utilizing caller identification and other electronic signals utilized to perform communications with the caller 216. In one embodiment, the profiles 206 may automatically retrieve information from any number of databases, websites, or applications. The profiles 206 may extract information from the application interface 214, including email addresses, addresses, phone numbers, fax numbers, and other relevant information.

The profiles 206 may allow a caller to select a preferred method of entering user input, such as voice commands, text, or button selections. For example, the caller 216 may prefer to use an IVR system to communicate with the voicemail system 200. In another example, the caller 216 may select to provide user input digitally utilizing a QWERTY keyboard or other form of textual and numeric input. For example, the caller 216 may utilize an alphanumeric keyboard or button sequence or interface available through most telephonic devices. The text may utilize any number of typing formats including prediction logic in order to predict or correct what the user interface 208 predicts or extrapolates the user is typing or meant to type. The user may also specify information and settings within each of the profiles 206. The profiles 206 may store user information specifying how to manage communications from the caller 216 and any number of steps or actions to take. For example, a communication from the caller 216 may be forwarded to another device based on settings in the profiles 206.

In one embodiment, the user interface 208 may utilize audio feedback if the caller 216 does not have a display on the accessed telephonic device. Entered information may be converted to text and played back in an audio format to the caller 216 to ensure accuracy. The profiles 206 may also specify information regarding each caller. The information may include a name, nickname, relationship to the user, a phone number, an IP address, a messaging user name, an email address, alternative phone numbers, physical address, fax number, emergency contact, and other relevant information.

The user interface 208 is an interface for receiving user input and selections from the caller 216. In one embodiment, the user interface 208 may also be utilized by a user to access, manage, or control messages stored within the voicemail system 200. In one embodiment, the user interface 208 includes the IVR system. The IVR system may be utilized to enter information or a caller identifier that may be associated with the caller 216 and a profile that is already existing or newly created for the caller 216. For example, the IVR system may prompt the caller to enter user specified or default fields and parameters, such as a name and cell phone numbers.

The IVR system may allow a caller to utilize full sentences, commands, numbers, or spelling of specific characters in order to recognize particular commands or actions. For example, the user interface 208 may utilize the IVR system to receive a caller's name and email address as specifically spelled out character by character. The user interface 208 may also include a graphical user interface (GUI) or application for receiving text, numerical information, and data from the caller 216. For example, the caller 216 may utilize the alphanumeric keypad to make selections that may or may not be visible to the caller depending on the type of telephonic device the caller uses. The interface logic 210 is the logic that is operable to make determinations and initiate and implement specific actions based on user input from the caller 216, a user, or administrator of the voicemail system 200.

The interface logic 210 may make any number of determinations or decisions. In one embodiment, the interface logic 210 may utilize information provided by the caller 216 or information automatically retrieved by the voicemail system 200 in order to determine whether the caller 216 is authorized to leave a message. For example, the user may have blocked particular callers from leaving messages in order to prevent harassment or for purposes of safety or convenience. In another example, the voicemail system 200 may screen out recorded messages. The interface logic 210 may also determine whether the caller 216 is associated with one or more of the profiles 206. For example, the interface logic 210 may perform a text, numeric, or voice recognition search for information stored within the profiles 206.

The voice-to-text converter 212 is an application operable to convert speech or other audible sounds or indicators into text or command. In one embodiment, the voice-to-text converter 212 may utilize an integrated portion of the user interface 208 to interpret or translate letters, numbers, sentences, commands, and other user input into text. The voice-to-text converter 212 may be utilized to populate any number of fields, sections, or portions of caller information or a visual or standard voicemail inbox. For example, when prompted, the caller 216 may speak a purpose for a call or subject. The purpose as spoken by the caller 216 may be converted to text that is displayed within a particular message. Similarly, the caller 216 may speak information that may be converted to text and numbers that may be integrated as part of the profiles 206 for a stored message.

The voice-to-text converter 212 may also include a voice recognition application. The voice recognition application may automatically retrieve a caller identifier from a voicemail message left by the caller 216. As a result, the caller identifier may associate the voicemail message with the correct profile within the profiles 206 regardless of the phone, line or device utilized by the caller 216.

The application interface 214 is a program configured to interact with one or more applications. In one embodiment, the application interface 214 may interact with the user's email program to synchronize contacts. In another embodiment, the contacts, soft phone settings, and other information may be retrieved and synchronized between a wired voice over Internet protocol (VoIP) phone and a cell phone utilized by the user. The application interface 214 may automatically or manually retrieve information from the caller 216 or other calling parties to store or archive within the profiles 206. In one embodiment, the application interface 214 may also export all or portions of the profiles 206 to other applications in order to prompt better communications for the user. For example, the user may retrieve contacts from applications locally accessible from a telephonic device or through one or more networks. For example, the application interface 214 may compile a list of numbers, lines, or devices the caller 216 typically calls the user from.

As previously described, the profiles 206 and the user interface 208 may utilize voice recognition information patterns or data to determine the identity of the caller 216. The profiles 206 may store a library or collection of voice samples for a number of callers. The samples or references may be predetermined sentences, words, or commands that may be utilized as a caller identifier or to determine whether the caller 216 is who she says she is. The voice recognition information may be utilized to provide additional security and another level of protection for the user. In addition, messages may be filtered, screened, or sorted based on the determinations made by voice recognition logic or applications within the voicemail system 200. The caller identifier may be extracted utilizing voice recognition of a recorded message or the caller 216 may be prompted to speak a designated word, sentence or other information to authenticate the caller 216 is associated with a specified profile.

FIG. 3 is a flowchart of a process for receiving caller information in accordance with an illustrative embodiment. The process of FIG. 3 may be implemented by a telephonic device, voicemail system, answering machine, or other similar device, in accordance with the illustrative embodiments. The process of FIG. 3 may begin by receiving a call from a caller (step 302). The caller or calling party may be communicating with the user or receiving party utilizing any number of wired or wireless networks, equipment, and devices. In one embodiment, the call may be routed to the voicemail system from the caller to the user. In another embodiment, the voicemail system may intercept or retrieve the call in response to the user not answering the phone or based on a user configuration to send communications directly to voicemail.

Next, the voicemail system determines whether the caller is associated with a profile (step 304). The determination of step 304 may be performed in any number of ways. In one embodiment, signaling information, such as, caller ID may be utilized to determine whether a phone number, IP address, voice characteristics, or other information and data retrievable from the communication or caller is associated with the profile. In another embodiment, the user may be requested to enter a caller identifier as described further. The caller identifier may be user entered utilizing text and numbers or retrieved utilizing voice recognition information or an IVR.

If the caller is not associated with a profile, the voicemail system requests information regarding the caller (step 306). In one embodiment, the information may be requested utilizing an interactive voice response system. For example, a prompt may indicate to a user "say your name or key in your name utilizing your alphanumeric key pad". The information may include any number of fields, data, and information about the caller, such as, name, relationship to the user, phone number, IP address, messaging user name, email address, or other relevant information. In some embodiments, a caller may block or hide caller identification information, such users may be required to enter or select profile information.

Next, the voicemail system receives the information as user input (step 308). The user input may be spoken or entered utilizing the telephonic device. In one embodiment, the user input is retrieved as entered utilizing an application browser or other interface between the voicemail system and the telephonic or computing device, utilized by the caller. An IVR, voice-to-text, and voice recognition logic may also be utilized to receive input from the user. In one embodiment, the caller may audibly or visually verify the user input for accuracy.

Next, the voicemail system associates the information with a new profile or existing profile (step 310). In one embodiment, a first time caller may be associated with a new profile. The new profile may be utilized to store the information received in step 308. Similarly, the profile may store voice recognition information and other data that may not be explicitly entered by the caller. For example, based on an identity of the caller, an application interface may retrieve other information that the user may have stored in other applications or programs, such as, an email program, calendar application, contacts database, online directories, or other similar user applications utilizing information, such as the caller's name.

In another embodiment, the voicemail system may determine the caller already has an existing profile. The newly entered information may be added to or supplemented to the caller's profile. For example, the profile for a user may include personal business and organizational information including communications, preferences for each part of the caller's life or work based on the caller's disposition to reveal the information requested during step 306.

During step 310, the new or existing profiles may be stored or archived for utilization by the voicemail system or other devices with authorizational information. After performing step 310, the voicemail system may implement step 314. In response to determining that the caller is associated with a profile in step 304, the voicemail system may perform voicemail messaging (step 314). In one embodiment, the voice mail messaging may incorporate the prompts and message recording features utilized by nearly all voicemail systems.

Next, the voicemail system prompts the user for one or more caller identifiers (step 316). The caller identifiers may be a name, nickname, phone number, password, commands, sentence dedicated for voice recognition, or other identifying informational data. The caller identifiers may be utilized by the voicemail system as an alternative to paying for caller identification information from one or more communications service provider databases. In another embodiment, the caller identifier may be automatically received or identified utilizing voice recognition while the caller is leaving a message during step 314.

Next, the voicemail system receives the caller identifier, associates the caller identifier with a profile, and positions the message utilizing the caller identifier (step 318). In one embodiment, the caller may be a user's mother. In response to speaking "mom", typing "mom", or a derivative, such as, "mother", "mom", or "mama", the caller may be associated with a profile utilized by the user's mother. As a result, the message may be categorized, filed, or organized within the visual voicemail system of the user. For example, if the user selects to answer all messages from his or her mother first, the messages received from the user's mother may be placed in a first display folder or category within the voicemail system.

In another embodiment, the user may select to ignore messages from his/her mother and as a result, the messages may be placed in a folder that is given a lesser priority or the messages may be deleted altogether. For example, in response to providing a caller identifier, the caller may be alerted that the user is not accepting messages from the caller at the moment. The caller identifier may be utilized to provide additional messages or information, such as, "don't call back" or "email me" or "call me at this number" in order to further enhance communications with any number of callers.

The caller identifier may also include information, such as priority, status, and other information that may be utilized to distinguish different messages. For example, the caller may indicate whether the message is personal or for business. The caller may also specify specific categories or provide a subject of the message. In one embodiment, the user may select or be assigned a call identifier which may be a short code, word, or other portion of the information submitted to the voicemail system. The caller may also set preferences allowed by the user. For example, the caller may be allowed to set an expiration date for a message so that if the message is not retrieved before a particular date and time, the message may be automatically deleted. The caller or user may also select to forward messages from callers based on their caller's priority.

Next, the voicemail system displays the message to the user (step 320). The caller identifier, as well as, the information within the caller's profile, may be utilized to display more information to the user. The user may visually or otherwise manage and sort messages utilizing the caller identifiers, profiles, fields, or other information stored by the voicemail system. For example, the user may say or select to "see all messages from Surie." The voicemail system may automatically sort the messages based on parameters and information from the message or profile. The voicemail system may also prompt the user to select specific folders or provide other information.

In one embodiment, the determination of step 304 may be determined after step 316 in which the one or more caller identifiers are received. The determination and associated paths of whether the caller is associated with a profile in step 304 may be performed utilizing the caller identifiers. As a result, if the caller is not associated with a profile based on the caller identifier, the new profile or an existing profile may be created or modified. As a result, the profiles may be utilized after the voicemail message is recorded, as prompted by the voicemail system in a step, such as step 314.

The process of FIG. 3 may allow a caller to be associated with a profile regardless of whether the user is calling from a device, line, phone or other element recognized by the voicemail system and user's phone. As a result, messages are more easily managed in the visual voicemail system.

FIG. 4 is a pictorial representation of a user interface in accordance with an illustrative embodiment. FIG. 4 is one embodiment of a user interface 400. The user interface 400 is a graphical representation of an IVR system, GUI, or other application that may be utilized to receive user input from a caller or from the user. In one embodiment, the user interface 400 includes any number of fields, buttons, icons, dropdown menus, selection elements, identifiers, hyperlinks, or other information and selection elements.

In particular, the user interface 400 may be an example of some of the voice prompts that may be given to a user by the IVR to receive specific information. The user interface 400 may include various sections, including profile 402, caller input 404, information 406, and caller identifier 408. The profile 402 may be utilized to determine whether the caller is associated with an existing profile or whether a new profile may need to be created for the caller. For example, the caller of the user may utilize a dropdown menu to select from available profiles to determine whether an existing profile is available under the user's name. The caller or user may also send or select a picture to be associated with the profile.

The caller input 404 may allow a user to interact with the user interface 400 or voicemail system utilizing an IVR system, GUI, application, virtual system, direct connection, or other communication link, funnel, or interface. In one embodiment, a selection within the caller input 404 may be made based on the initial type of communication or user input provided by the user.

The information 406 may include specific details about the caller. Any number of fields, data, and information may be retrieved in addition to those examples shown. For example, the caller may also be prompted to enter a fax number, secondary phone numbers, personal and business information for each category, and other relevant information.

The caller identifier 408 may be a preferred way of identifying the caller from any number of other callers and associating the callers with his or his profile stored within the user interface 400 and voicemail system. In one embodiment, the caller may utilize a name. In another embodiment, the caller may utilize a nickname, keyword, password, messaging name, or key phrase. The caller identifier 408 also shows examples of information that may be stored as part of a message. For example, the user interface 400 may prompt the user to speak or enter a reason for a call. Similarly, a voice message left by the caller may be converted to text for easier management of visual voicemail messages and in order to more efficiently communicate.

The illustrative embodiments provide a system and method for receiving more information for utilization by a visual voicemail system. As a result, expensive databases and caller identification information may not be required by the service provider in order to retrieve caller information utilized within the voicemail system inbox and other folders. The user may be able to retrieve or obtain valuable information directly from the caller in order to more efficiently answer or ignore messages and otherwise manage the data and information received by the user telephonically.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed is:

1. A method of receiving information for voicemail, the method comprising:
   receiving, at a computer system, a call from a caller;
   recording, with the computer system, a voicemail message from the caller;
   identifying the caller, with the computer system;
   interfacing, at the computer system, with a user application to retrieve contact information for the identified caller, wherein the user application comprises at least one of an electronic mail program or a calendar program;
   compiling, from the contact information retrieved from the user application, a plurality of contact numbers for the caller; and
   storing the voicemail message along with the plurality of contact numbers for the caller.

2. The method of claim 1, wherein the user application is an electronic mail program.

3. The method of claim 1, wherein the user application is a calendar program.

4. The method of claim 1, wherein the user application comprises a contact database.

5. The method of claim 1, wherein the user application accesses an online database.

6. The method of claim 1, wherein receiving a caller identifier further composes:
   utilizing voice recognition to determine the caller identifier from the voicemail message.

7. The method of claim 6, wherein the caller identifier includes a name spoken by the caller.

8. The method of claim 6, further comprising:
   prompting the user to speak a reference for determining the caller identifier.

9. The method of claim 1, wherein the receiving further comprises:
   intercepting the call intended for a user by a voicemail system;
   identifying the caller regardless of a phone or line utilized by the caller.

10. The method of claim 1, wherein the caller identifier is received as alpha numeric input through a telephonic device.

11. A voicemail system comprising:
    a processor for executing a set of instructions;
    a memory in communication with the processor, the memory operable to store the set of instructions, wherein the set of instructions are executed to:
    receive a call from a caller;
    record a voicemail message from the caller;
    identify the caller;
    interface with a user application to retrieve contact information for the identified caller, wherein the user application comprises at least one of an electronic mail program or a calendar program;
    compile, from the contact information retrieved from the user application, a plurality of contact numbers for the caller; and
    store the voicemail message along with the plurality of contact numbers for the caller.

12. The system of claim 11, wherein the user application is an electronic mail program.

13. The system of claim 11, wherein the user application is a calendar program.

14. The system of claim 11, wherein the user application comprises a contact database.

15. The system of claim 11, wherein the user application accesses an online database.

16. The system of claim 11, wherein receiving a caller identifier further composes:
    utilizing voice recognition to determine the caller identifier from the voicemail message.

17. The system of claim 16, wherein the caller identifier includes a name spoken by the caller.

18. The system of claim 16, further comprising:
    prompting the user to speak a reference for determining the caller identifier.

19. The system of claim 11, wherein the receiving further comprises:
    intercepting the call intended for a user by a voicemail system;
    identifying the caller regardless of a phone or line utilized by the caller.

20. The system of claim 11, wherein the caller identifier is received as alpha numeric input through a telephonic device.

\* \* \* \* \*